United States Patent [19]

Osada et al.

[11] 4,177,849

[45] Dec. 11, 1979

[54] SAFETY WHEEL

[75] Inventors: Isao Osada, Izumi; Shoichi Sano, Tokorozawa, both of Japan

[73] Assignees: Ohtsu Tire & Rubber Co., Ltd., Izumiotsu; Honda Giken Kogyo Kabushiki Kaisha, Tokyo, both of Japan

[21] Appl. No.: 922,506

[22] Filed: Jul. 6, 1978

[30] Foreign Application Priority Data

Jul. 7, 1977 [JP] Japan ................................ 52-81208
Jul. 7, 1977 [JP] Japan ................................ 52-81210
Jul. 7, 1977 [JP] Japan ................................ 52-81211

[51] Int. Cl.² ........................................... B60C 17/04
[52] U.S. Cl. ........................... 152/158; 152/330 RF; 152/330 L; 152/363
[58] Field of Search ............ 152/152, 155, 157, 158, 152/330 R, 330 RF, 330 L, 362 R, 363, 364

[56] References Cited

U.S. PATENT DOCUMENTS

| | | | |
|---|---|---|---|
| T963,004 | 10/1977 | Van Wicklin | 152/330 RF |
| 2,857,951 | 10/1958 | Roudebush | 152/363 |
| 2,910,106 | 10/1959 | Keefe | 152/363 |
| 3,610,308 | 10/1971 | McDonald | 152/158 |
| 3,638,701 | 2/1972 | Rossler et al. | 152/158 |
| 3,828,836 | 8/1974 | Bradley | 152/330 L |
| 3,872,907 | 3/1975 | Curtiss et al. | 152/158 |
| 3,930,527 | 1/1976 | French | 152/330 RF |
| 4,091,854 | 5/1978 | French et al. | 152/158 |
| 4,121,640 | 10/1978 | Henning et al. | 152/158 |

*Primary Examiner*—John E. Kittle
*Attorney, Agent, or Firm*—Haseltine, Lake & Waters

[57] ABSTRACT

A safety wheel including a combined flat protector and bead stopper structure radially fitted in the tire around the inner periphery thereof and having a closed frame-like cross-sectional configuration of a substantial modulus of section. The flat protector, being made itself of an elastic material in a substantially H-shaped cross section, is easily deformable and can be readily inserted in the tire and, once combined with the bead stopper, which clamps the opposite side wall portions of the flat protector and the respective bead portions of the tire against the rim flanges, exhibits a substantial rigidity enough to support the vehicle weight, as when the tire is punctured. The rigidity of the flat protector per se is also increased by means of reinforcing cords of unstretchable material embedded therein. Formed on the outer periphery of the opposite side walls of the flat protector are a pair of laterally aligned straight puncture-sensing regions which extend in parallel to a tangent thereto, lying radially outside of the bottom of the annular recess in the outer periphery of the flat protector of H-shaped cross section. The straight puncture-sensing regions, allowing the vehicle body to descend each time such regions are positioned directly opposite to the road surface during travel of the vehicle with the tire punctured, serve to produce a puncture alarm signal in the form of shocks transmitted to the vehicle body, which warns the driver of the need for prompt tire replacement immediately upon tire puncture.

12 Claims, 7 Drawing Figures

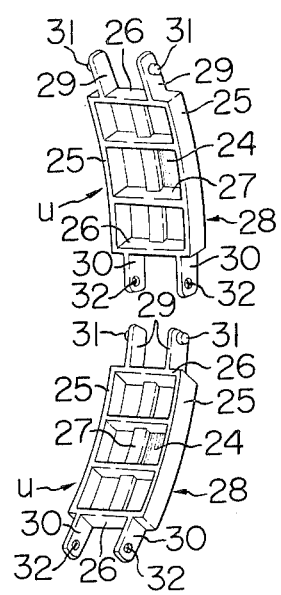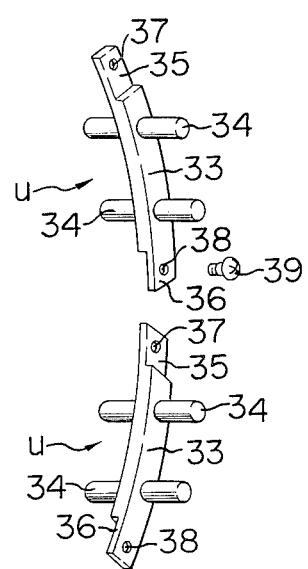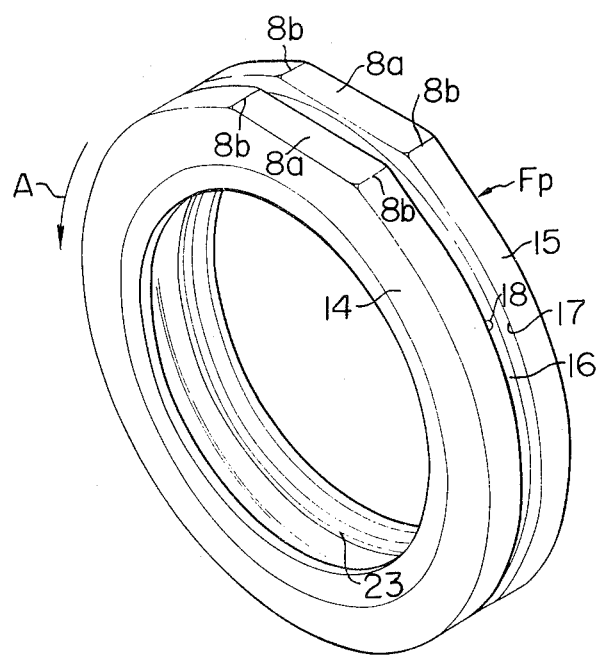

SAFETY WHEEL

BACKGROUND OF THE INVENTION

This invention relates to safety wheels for vehicle use which are capable of supporting the vehicle in a manner such as to enable it to continue to travel safely without any trouble even upon failure of the tire air pressure as resulting from tire puncture.

Generally, in the event that the air sealed in a tire is lost due to puncture or any other tire failure during travel of the vehicle particularly to an express highway or a crowded road, tire replacement on the spot must be extraordinarily dangerous and in some cases practically impossible. Accordingly, it is highly desirable to enable the vehicle safely to continue to travel even upon the tire failure, as it enables the driver to send the vehicle at once to any of the nearest repair shops without going to the trouble of tire replacement. Obviously, this means a great convenience to the driver even in cases where the traffic condition allows tire replacement on the road.

Accordingly, developments of a safety wheel that makes it possible to drive the vehicle even in the event of tire puncture safely to a repair or other suitable place with a minimum of damage to the tire punctured have been in demand and various forms of safety wheel have previously been proposed in which a flat protector is built in the tire to support the vehicle upon tire puncture in place of the lost tire air pressure thereby to enable the vehicle to safely continue to travel. In this connection, it is desirable that the flat protector once built in the tire exhibit a rigidity as high as possible in order to efficiently serve the intended function of supporting the vehicle in place of the tire air pressure lost when the tire is punctured. On the other hand, it is desired that the flat protector, a unit to be built in the tire, be made itself to exhibit only a rather limited rigidity in order to facilitate its assembling into the tire. In the past, however, there has been no form of flat protector proposed that can satisfactorily meet both of these two requirements.

SUMMARY OF THE INVENTION

Under these circumstances, the present invention has for its object the provision of a novel form of safety wheel of the type described which is simple in structure, comprising, among others, a flat protector of special construction arranged in a predetermined position within the tire to support the vehicle without fail in place of the tire air pressure as lost upon puncture of the tire thereby to enable continued safe and smooth travel of the vehicle with a minimum of damage to the tire punctured while serving to effectively reduce shock transmission to the body of the vehicle and minimize loss of riding comfort.

Another object of the present invention is to provide a safety wheel of the character described which comprises, among others, a flat protector and a bead stopper both adapted to be readily incorporated in the tire and, once incorporated, jointly form a structure rigid enough to support the vehicle weight in a stable positive fashion in place of the tire air pressure whenever the tire is punctured.

In general, the flat protector, intended to support the vehicle weight, taking the place of the tire air pressure upon puncture of the tire, and the bead stopper serving to hold the tire bead portions in place on a wheel rim against disengagement therefrom should be made themselves rigid enogh to satisfactorily perform their function. On the other hand, however, any substantial increase in their rigidity will heavily impair their assemblability, rendering their incorporation and positioning in the tire rather difficult, and this involves the danger that during their assembling, these component members be excessively strained to result in their impairment or breakage. If either of these components is not set accurately in its predetermined position in the tire, these arise various difficulties including reduction in performance and unbalance of rotating mass, which results in increased vibration and hence impaired riding comfort.

In view of the above, the present invention has for its further object the provision of a safety wheel of the type described which comprises, among others, a flat protector and a bead stopper both designed so as to be readily and easily incorporated in the tire and accurately positioned therein and, once incorporated, to form in combination a structure having a rigidity high enough to enable the wheel to effectively support the vehicle weight acting thereon even when the tire is punctured and thus enables the vehicle to continue to travel smoothly and safely with a minimum of damage to the tire punctured.

Further, in order to minimize shock transmission from the tire punctured to the body of the vehicle, it is contemplated to impart an appropriate shock-obsorbing characteristic to the flat protector. In this connection, however, it is to be noted that, if, upon tire puncture, air leaks out of the tire only gradually, the driver may possibly be left himself unaware of the situation until and even after the tire tread has come to bear against the flat protector. If the driver continues to drive the vehicle at high speed for any extended length of time, both the tire and the flat protector may possibly be damaged owing to any excessive friction arising therebetween. Accordingly, some arrangement should be made to produce an appropriate alarm signal effective to inform the driver of the tire condition and the need for tire replacement as prompt as possible.

Accordingly, it is yet another object of the present invention to provide a safety wheel of the type described which is designed to meet all the requirements described above and, among others, that for production of an alarm signal and simple in structure.

The foregoing and other objects, features and advantages of the present invention will become apparent from the following detailed description when taken in conjunction with the accompanying drawings.

BRIEF DESCRIPTION OF THE DRAWINGS

In the drawings:

FIG. 3 is an exploded view, in perspective, of the bead stopper assembly of FIG. 2, showing two adjacent units thereof;

FIG. 4 is a view similar to FIG. 3, showing another form of bead stopper unit;

FIG. 5 is a perspective view of the entire flat protector shown in FIG. 1 and formed according to the present invention;

DESCRIPTION OF THE PREFERRED EMBODIMENT

Figure 1:
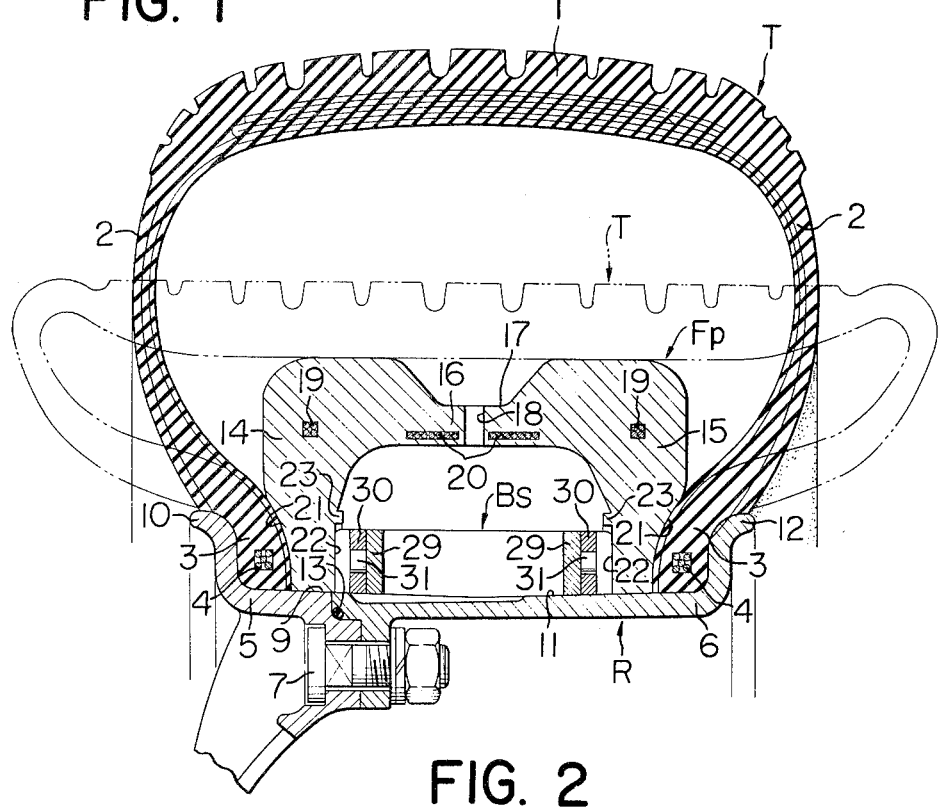
FIG. 1 is a fragmentary transverse cross section of a safety wheel embodying the present invention.

Referring to the drawings and first to FIG. 1, there is illustrated a safety wheel embodying the present invention, which is comprised of a tubeless tire T (which will be referred to hereinafter simply as a tire), a split rim R, a flat protector Fp and a bead stopper Bs. These component parts will be described below in turn in detail.

First, the tire T is of a well-known conventional structure and formed bisymmetrical, including a tread portion 1, a pair of right and left side wall portions 2 extending integrally therefrom and a pair of bead portions 3 which extend integrally from the respective side wall portions 2, having a gradually increasing thickness. Bead wires 4 are embedded in each of the bead portions 3.

Next, the split rim R is formed of an outboard section 5 and an inboard section 6, which are integrally connected together by means of a plurality of connecting bolts 7. The outboard rim section 5 includes a body portion formed with an integral rim base 9 of a narrow width and a rim flange portion 10 extending integrally from the outside thereof to serve the purpose of holding the adjacent bead portion 3 of the tire T in place. The inboard rim section 6 is constituted of a body portion including a rim base 11 of a larger width and a rim flange 12 extending integrally from the outside thereof to serve the purpose of holding the adjacent tire bead portion 3 in place. The rim bases 9 and 11, respectively, of the outboard and inboard rim sections 5 and 6 cooperate to form a flat or cylindrical-shaped base surface of the split rim R on which the flat protector Fp and bead stopper Bs are supported, as shown, around the respective inner periphery thereof. An O-ring 13 is inserted at the juncture of the outboard and inboard rim sections 5 and 6 in a position radially outside of the connecting bolts 7.

Description will next be made of the construction of the flat protector Fp, which is made annular in general form so as to be inserted into the tire T around the entire periphery thereof. The flat protector Fp has a cross-sectional configuration specially designed to exhibit an appropriate degree of rigidity to fully perform the intended function and, being made of a suitable elastic material such as a synthetic or natural rubber or a synthetic resinous material, exhibits an appropriate degree of elasticity as well. Further, the flat protector Fp is bisymmetrical in transverse cross section, including a pair of spaced opposite annular side wall portions 14 and 15 and an annular bridging wall portion 16 which interconnects the side wall portions 14 and 15, extending between those sections thereof which lie slightly radially inside of the outer peripheral surfaces of the respective side wall portions 14 and 15. Thus, the flat protector Fp as a whole is substantially H-shaped in transverse cross section with an annular recess or groove 17 formed in the middle of the outer peripheral surface thereof. Formed in the middle of the bridging wall portion 16 are a plurality of circumferentially spaced-apart radially extending vent holes 18 which intercommunicate the spaces inside and outside of the flat protector Fp. Annular reinforcing cords 19 of unstretchable material such as steel wire are embedded in the flat protector Fp at the junction between the bridging wall portion 16 and the side wall portions 14 and 15. Further, annular reinforcing cords 20 of like material are embedded in the bridging wall portion 16 on the opposite sides of the row of vent holes 18. These reinforcing cords 19 and 20 together serve to increase the rigidity of the flat protector Fp, which is made itself of an elastic material, as described above. The reinforcing cords 19 and 20 may be made of a synthetic resinous material such as Nylon resin, if desired, to make the resulting flat protector lighter in weight and hence in moment of rotation.

Each of the side wall portions 14, 15 of the flat protector Fp is formed at its outside bottom with a bead-bearing surface 21 concavely curved for fitting engagement with the inside surface of the neighboring bead portion 3 of tire T. Also, formed at the inside bottom of each of the side wall portions 14 and 15 is a substantially flat stopper-bearing surface 22 for fitting engagement with the adjacent side surface of the bead stopper Bs, which will be described later in detail. An annular engaging portion 23 is formed on the inside of each side wall portion 14 or 15 at a location radially outward of the stopper-bearing surface 22 to serve the purpose of guiding the bead stopper Bs when the latter is inserted between the opposite side wall portions 14 and 15 and holding the bead stopper in place against radially outward movement.

Figure 6:
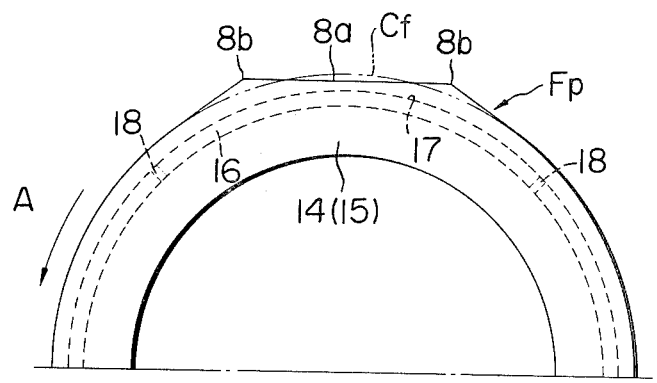
FIG. 6 is a side elevational view of one half portion of the same.

Referring next to FIGS. 5 and 6, the opposite side wall portions 14 and 15 of flat protector Fp are formed on their outer periphery with respective straight puncture-sensing surface regions 8a which lie in phase with each other between the outer peripheral circle Cf of the flat protector Fp and the bottom surface of the annular recess 17 in the bridging wall portion 16, extending in parallel to a tangent line to the outer peripheral circle Cf.

The two straight puncture-sensing surface regions 8a are extended at each end thereof to form a pair of puncture-sensing ridges or projections 8b which extend radially outwardly beyond the outer peripheral circle Cf in aligned symmetrical relation to each other. In order just to serve their intended function, such paired puncture-sensing ridges 8b may only be provided at the leading end of the straight puncture-sensing regions 8a as the flat protector Fp rotates forwardly in one direction A during normal travel of the vehicle. It is to be noted, however, that the ridge formation described above, including two pairs of puncture-sensing ridges 8b at the respective ends of the straight regions 8a, is recommendable as it precludes functional difficulties that may otherwise occur in cases where the normal direction of rotation A of the flat protector Fp is reversed as when the tire is replaced from one side from the other of the vehicle.

Figure 2:
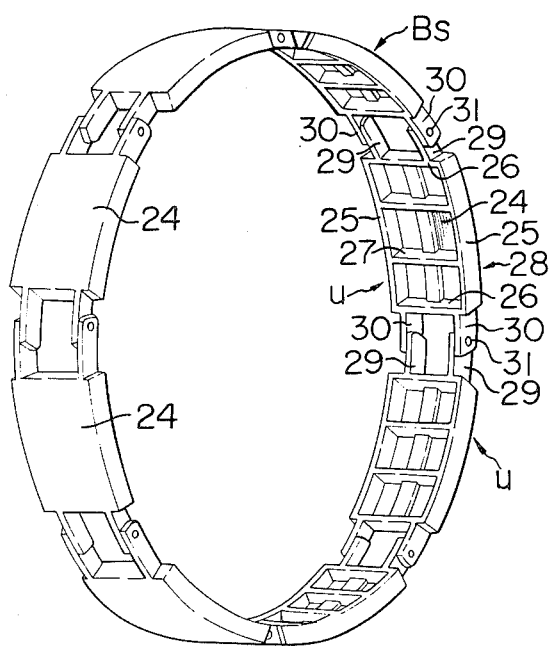
FIG. 2 is a perspective view of the bead stopper assembly shown in FIG. 1.

Description will next be made of the construction of the bead stopper Bs with reference to FIGS. 2 and 3. As illustrated, the bead stopper Bs is of an annular structure including a plurality of pivotally interconnected stopper units u. Each of the stopper units u includes a body portion 28 which is comprised of an arcuately curved rectangular plate member 24, pairs of longitudinal and transverse edge pieces 25 and 26 formed integral with the plate member 24 around the periphery thereof, and a lattice-like formation of reinforcing ribs 27 which is integral with the plate member 24 and edge pieces 25, 26 and serves to fully increase the rigidity of the body portion 28 in cooperation with the edge pieces 25, 26. A pair of spaced parallel lugs 29 are formed on the unit body portion 28 at one longitudinal end thereof while on the other longitudinal end of the unit body 28 are formed another pair of parallel lugs 30 which are spaced from each other by a distance slightly larger than that between the lugs 29. Formed on the lugs 29 are a pair of connecting pins 31 which protrude laterally outwardly therefrom in aligned relation to each other while in the lugs 30 are formed a pair of aligned holes 32 for receiving the connecting pins 31 formed on the lugs 29 of the neighboring stopper unit u. As will readily be understood, any two adjacent stopper units u can be interconnected for free pivotal movement relative to each other by inserting the pair of lugs 29 on one of the two stopper units u between the paired lugs 30 on the other stopper unit u until the connecting pins 31 on the lugs 29 are fitted into the respective holes 32 in the lugs 30 to form a pivotal connection between the stopper units. It will be apparent that, by repeating such procedure to connect all the stopper units u in a successive fashion, the annular bead stopper Bs can readily be completed.

FIG. 4 illustrates another form of bead stopper Bs usable with the flat protector Fp. In this embodiment, each stopper unit u includes a bar-like body portion 33 which is curved to conform to the outer peripheral surface of the base portion 11 of inboard rim section 6. Formed on each of the lateral sides of the unit body 33 integrally therewith are a pair of cylindrical-shaped parallel projections 34 which are spaced from each other longitudinally of the unit body 33. Further, the stopper unit body 33 is formed at its opposite ends with a pair of integral lugs 35 and 36, which are offset from each other and formed respectively with a tapped hole 37 and a plain hole 38. In order to interconnect two neighboring stopper units u in this embodiment, the lug 35 of one stopper unit u is laid on the lug 36 of the other so that the tapped and plain holes 37 and 38 in the respective lugs are aligned with each other and a headed pivot screw 39 is threaded into tapped hole 37 through plain hole 38.

In either form of bead stopper Bs, it should be rigid and heat-resistant enough to withstand compressive and bending forces, heat and other external effects to which it is subjected when the tire is punctured and also be as lightweight as possible to avoid any substantial increase in moment of rotation of the wheel. Such bead stopper may be formed of any of different materials, including aluminum alloy, steel and synthetic resinous material, which meet the requirements stated above and, among others, Nylon resin including glass fibers in the range of from 5% to 90% and preferably from 10% to 50% is practically highly desirable because of its moldability and other characteristic properties.

The flat protector Fp and bead stopper Bs constructed as described above are incorporated in the tire T in the following manner. First, the flat protector Fp is radially inserted into the tire T through its opening around the inner periphery thereof so that the concavely curved bead-bearing surfaces 21, formed at the outside bottom of the opposite side wall portions 14 and 15 of the flat protector Fp, are placed in bearing engagement with the inside surfaces of the respective bead portions 3 of tire T. In this connection, it is to be noted that the flat protector Fp, being formed of an elastic material and widely open around the inner periphery thereof, is readily deformable and can be easily inserted into the tire in the manner described above.

Next, the bead stopper Bs assembled as described into an annular formation is inserted into the inner peripheral opening of the tire T so that the opposite side surfaces of the stopper units u are placed in bearing engagement with the stopper-bearing surfaces 22 of the flat protector Fp previously inserted into the tire. As will be readily understood, such insertion of bead stopper Bs into tire T can be effected without any difficulty as the bead stopper Bs is freely flexible both in radially inward and outward directions because of the pivotal interconnection of stopper units u by means of connecting pins 31 or pivot screws 39.

After the flat protector Fp and bead stopper Bs have been incorporated in the tire T, the outboard and inboard sections 5 and 6 of the split rim R are fitted into the respective sides of the tire T and secured together by means of connecting bolts 7 to form an integral rim assembly, in which the flat protector Fp and bead stopper Bs are in fitting engagement with the outer peripheral surface of the rim base, now formed of the base portions 9 and 11, respectively, of the outboard and inboard rim sections 5 and 6. The bead portions 3 of tire T are firmly clamped, together with the respective side wall portions 14 and 15 of flat protector Fp, between the bead stopper Bs and the respective flanges 10 and 12 of split rim R and the tire T is thus held air-tight against the latter.

Figure 7:
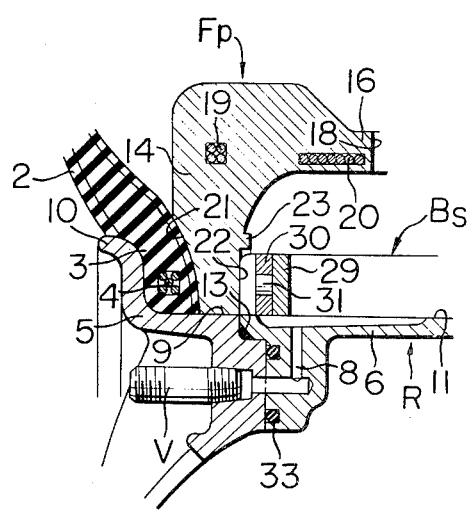
FIG. 7 is a fragmentary transverse cross section of the safety wheel of FIG. 1, taken in another radial plane or section.

Finally, referring to FIG. 7, air under pressure is introduced through an air supply valve V, provided on the outboard side of the split rim R, into the tire T. The pressure air, as introduced through the valve V, is directed through an inlet air passageway 8, formed in the rim base portion 9, 11 of split rim R, first to fill the space inside of the flat protector Fp. As illustrated, the inlet air passageway 8 is connected at one end with the air supply valve V, opening at the other end in the outer peripheral surface of the base portion 9, 11 of the split rim R. The pressure air, directed inside of the flat protector Fp, is further directed through the vent holes 18 and annular recess 17 formed therein to fill the space inside of the tire T. In this connection, it is to be noted that, even if, in the initial stage of pressure air supply, the tire T is in a flat state under the vehicle weight with its tread portion 1 held in bearing engagement with the outer peripheral surface of flat protector Fp, as indicated in FIG. 1 by the chain-dotted lines, the vent holes 18 are never closed by the tire tread portion 1 as they are formed open to the annular recess 17 in the outer peripheral surface of flat protector Fp. This enables the tire T to be filled with air under pressure at all times smoothly despite of the flat protector Fp incorporated therein.

An appropriate amount of lubricant material is also injected into the tire T through the air supply valve V in order to lubricate those surfaces of tire tread portion 1 and flat protector Fp which are placed in bearing engagement with each other, as when the tire T is punctured, thereby to prevent the bearing regions of the two components from being impaired under friction otherwise occurring therebetween. Incidentally, the lubricant injected is initially held inside of the flat protector Fp and subsequently upon rotation of the wheel is directed under the effect of centrifugal force through the vent holes 18 to the inside of the inflated tire T, ready to serve the intended lubricating function described above.

In the normal state of tire T, inflated to a predetermined level of pressure, as indicated in FIG. 1 by the solid lines, the tire T serves to support the vehicle weight through the medium of the air pressure in the tire T but, if the air sealed therein is lost, for example, upon tire puncture, the tire T collapses until its bead portion 1 becomes flat bearing against the top surface of flat protector Fp and now the latter, taking over the role of the tire air pressure, acts to support the vehicle weight. In this event, owing to the special construction described of the flat protector Fp, the load acting on the tire T is quite evenly distributed to the paired side wall portions 14 and 15 of the flat protector Fp independently from the bridging wall portion 16 thereof while the latter 16 serves to add to the rigidity of the side wall portions 14 and 15 thereby to effectively prevent any collapsing or tilting thereof. This makes it possible for the driver to continuingly drive the vehicle safely, for example, to one of the nearest repair shops.

During such travel of the vehicle with the tire punctured, the straight puncture-sensing regions 8a of the rotating flat protector Fp cause the vehicle body and particularly the neighbouing portion thereof to descend by a distance corresponding to the maximum distance of the straight regions 8a from the peripheral circle Cf of the flat protector Fp each time they come into a position directly opposite to the road surface and the resulting shocks to the vehicle body serve as an alarm signal effective to inform the driver of the tire trouble. Specifically, the straight puncture-sensing regions 8a have a substantially extended area for their contact with the road surface through the intermediary of the tire tread portion 1 and are thus subjected only to a limited level of pressure per unit area and hence to a limited compressive deformation. This enables the straight regions 8a to solidly support the descending vehicle body with an impact given thereto. In this connection, it is to be noted that, even at the very instant when the straight regions 8a come into direct contact with the road surface with the tire tread 1 interposed therebetween, the surfaces of the straight regions 8a remain radially outside of the bottom surface of the annular recess 17 formed around the flat protector Fp so that the even load distribution to the opposite side wall portions 14 and 15 and their load-supporting function are effectively maintained.

Further, during forward rotation of the tire punctured, the pair of puncture-sensing ridges 8b provided at the leading end of the straight puncture-sensing regions 8a act momentarily to raise the vehicle body each time they come to roll over the road surface together with the tire tread portion 1 and the distance of such rise of the vehicle body is added to the distance of its vertical descent that follows as the straight regions 8a are placed opposite to the road surface. This results in a substantial increase in strength of shocks transmitted from the faulty tire to the vehicle body, ensuring that the driver is alerted immediately to the need for prompt replacement of the tire punctured.

As previously described herein, the flat protector Fp serves, when the air sealed in the tire is lost as by puncturing, to receive the tread portion of the flattened tire thereby to support the load acting on the wheel, taking the place of the air pressure previously held in the tire, and according to the present invention, it has a substantially H-shaped cross-sectional configuration, including a pair of spaced opposite annular side wall portions 14, 15 and an annular bridging wall portion 16 extending integrally between those sections of the side wall portions which lie slightly radially inside of the outer periphery thereof. Formed in the middle of the flat protector around the outer periphery thereof is an annular groove or recess 17 and the bottom of which is always kept out of contact with the tread portion of the tire. Because of such cross-sectional configuration of the flat protector, the tread portion 1 of the tire when punctured comes into contact only with the outer peripheral surfaces of the opposite side wall portions 14, 15 of the flat protector, leaving the bottom of the annular recess 17 free, irrespective of whether the course of vehicle travel is straight or curved. In this manner, the vehicle weight and centrifugal forces acting on the wheel are distributed evenly to the opposite sides of the medial plane thereof and there arises no such excessive local concentration of external forces as may occur with conventional forms of flat protector. In other words, the external forces acting on the wheel are directly received by the opposite side wall portions 14, 15 of the flat protector Fp and transmitted therefrom to the split rim R, which is fitted to the inner peripheral surfaces of the side wall portions. In addition, the bridging wall portion 16 of the flat protector Fp, interconnecting the side wall portions 14, 15 in a position slightly radially inside of the outer peripheral surfaces of the latter, serves in effect to increase the rigidity of the side wall portions 14, 15 to a substantial extent both in longitudinal and transverse directions so that there is no danger of the side wall portions being buckled, flexed or otherwise deformed. It will thus be readily recognized that the flat protector of the present invention is capable as a whole of supporting the external forces acting on the wheel, as when the tire is punctured, effectively in a stable fashion to enable the vehicle to continue to travel safely with a minimum of damage to the tire punctured while at the same time alleviating the shocks transmitted to the vehicle body.

In addition, the opposite side wall portions 14, 15 of the flat protector Fp are substantially increased in rigidity at their base as they are firmly clamped at their base end between the bead stopper Bs and the respective flanges of the split rim R together with the respective bead portions 3 of the tire T. Moreover, the bead stopper Bs, closely fitted between the opposite side wall portions of the flat protector Fp in a position adjacent to the split rim R, forms together with the flat protector Fp a structure of a closed frame-like cross section having a substantially large modulus of section. As the result, not only the physical strengths, such as compressive, bending and buckling strengths, of the flat protector Fp but also its rigidity both in radial and axial directions are further increased to a substantial extent and this, in combination with the even load distribution on the flat protector, effectively prevents any buckling, collapsing or other deformation thereof. Accordingly, the flat protector of the present invention can support the load applied to the wheel in quite a stable and positive manner, enabling the vehicle to continue to travel safely with a minimum of damage to the tire punctured. With the combined flat protector and bead stopper structure, it will be readily recognized that loss of riding comfort, friction between the adjoining surfaces of the flat protector and the tread portion of the tire punctured and the resulting heat ganeration are effectively reduced to an extreme minimum.

Further, since the flat protector is securely held against any axial displacement by means of the bead stopper, dislocation of the tire bead portions clamped between the flat protector and the rim flanges is effectively prevented and the controllability of the vehicle is not impaired even when it is turned along a curved course of travel.

In assembling the safety wheel of the present invention, the annular flat protector can be readily inserted into the tire as it is formed of an elastic material in a substantially H-shaped cross-sectional configuration and thus, opening around the inner periphery thereof, is readily deformable. The flat protector thus inserted can be accurately positioned simply by fitting the bead-bearing surfaces 21, formed at the bottom on the opposite sides thereof, against the inside surfaces of the respective bead portions 1 of the tire T. The bead stopper, formed freely flexible both in radially inward and outward directions, can also be readily inserted into the tire by radially flexing the stopper itself as required and its positioning in the tire can be effected accurately with ease by placing the opposite side edges of the stopper in abutting engagement with the respective annular engaging portion 23 formed on the inside of the flat projector Fp. It will thus be recognized that the flat protector Fp and bead stopper Bs can both be incorporated in their respective predetermined positions within the tire with extreme ease and accuracy so as to fully serve their intended function without the danger of causing any rotatory oscillation as resulting from an unbalanced mass of rotation or of impairing the riding comfort of the vehicle.

Further, the combined flat protector and bead stopper structure, incorporated in the tire and having a closed frame-like cross-sectional confuguration, as described above, exhibits a markedly high rigidity and enables the tire-rim assembly to support the vehicle weight in an accurate and stable manner even when the tire is punctured.

Particularly, the flat protector itself exhibits a rigidity highly increased both in longitudinal and transverse directions under the combined effects of its substantially H-shaped cross-sectional configuration and the arrangement of reinforcing cords of unstretchable material, which are embedded in the opposite side wall portions of the flat protector around the outer periphery thereof and/or in the bridging wall portion on the opposite sides of vent holes, as described hereinbefore, and there is no danger of such flat protector being buckled, flexed or otherwise deformed. It will readily be noted that such flat protector, though formed itself of an elastic material, is fully capable of supporting the external forces acting on the wheel in a stable manner, thus enabling the vehicle to continue to travel safely with a minimum of damage to the tire punctured. The elastic formation of the flat protector itself enables it to efficiently absorb the shocks from the tire punctured and effectively support the vehicle weight with a minimum shock transmission to the vehicle body and hence with a minimum of loss of riding comfort.

Further, the straight puncture-sensing regions 8a of the flat protector Fp, which lie inside of the outer peripheral circle thereof and are practically free from any compressive deformation under load, act to impart to the vehicle body descent shocks which serve as an effective puncture-alarming signal for the driver, as the tire rotates with its tread portion bearing against the flat protector, and, even if the rate of air leakage from the tire punctured is very limited, no danger is involved that the driver continue to drive the vehicle for any extended length of time without noticing the tire failure. Moreover, the puncture-sensing ridges 8b, formed on the flat protector at least at the leading end of the straight puncture-sensing regions 8a so as to extend radially outwardly beyond the outer peripheral circle Cf of the flat protector, make the puncture-alarming signal in the form of descent shocks to the vehicle body more effective, serving to increase the total distance of vertical descent of the vehicle body occurring each time when the straight puncture-sensing regions 8a come into a position directly opposite to the road surface.

What is claimed is:

1. A safety wheel for vehicle use of the type including a split rim (R) comprised of at least two rim sections arranged axially adjacent to each other, a tubeless tire (T) mounted on said split rim, and a flat protector (Fp) arranged in the air chamber defined in said tubeless tire by said split rim for bearing engagement with the tread portion of said tubeless tire when the air sealed in the latter is lost, said flat protector being fitted around the inner periphery thereof to the rim base portion of said split rim and supported at the opposite sides by the respective bead portions of said tubeless tire, said safety wheel being characterized in that said flat protector takes the form of an annular elastic member of substantially H-shaped radial cross section having an annular recess (17) formed in the middle of the outer peripheral surface thereof, including a pair of spaced opposite annular side wall portions (14, 15) and an annular bridging wall portion (16) which extends between those sections of said opposite side wall portions lying slightly radially inside of the outer peripheral surfaces thereof to integrally interconnect said opposite side wall portions.

2. A safety wheel as set forth in claim 1, further comprising an annular bead stopper (Bs) incorporated together with said flat protector (Fp) in the air chamber defined in said tubeless tire (T) by said split rim (R) so as to clamp said opposite side wall portions (14, 15) of said flat protector (Fp) together with the respective bead portions (3) of said tubeless tire (T) against the respective rim flanges (12) of said split rim (R).

3. A safety wheel as set forth in claim 2, in which said flat protector (Fp) is formed on the outside bottom of each of said side wall portions (14, 15) with a bead-bearing surface (21) and on the inside bottom of each of said side wall portions with a stopper-bearing surface (22), said bead-bearing surface (21) being placed in abutting engagement with the inside surface of the adjacent bead portion (3) of said tubeless tire (T), said stopper-bearing surface (22) being placed in fitting engagement with the adjacent side surface of said bead stopper (Bs).

4. A safety wheel as set forth in claim 2, in which said flat protector (Fp) is formed on the inside of each of said opposite side wall portions (14, 15) with an integral annular stopper-positioning engagement portion (23) of a diameter larger than the outer diameter of said bead stopper (Bs), said stopper-positioning engagement portion (23) lying opposite to the adjacent side edge portion of said bead stopper for engagement therewith.

5. A safety wheel as set forth in claim 2, in which said bead stopper (Bs) is of an annular laterally inflexible structure and is fitted between said opposite side wall portions (14, 15) of said flat protector (Fp) and around the outer peripheral surface of the rim base portion (9, 11) of said split rim (R).

6. A safety wheel as set forth in claim 5, in which said bead stopper (Bs) is formed of a plurality of annularly interconnected rigid stopper units (u) so as to be freely flexible both in radially inward and outward directions, said stopper units (u) being each fitted between said opposite side wall portions (14, 15) of said flat protector (Fp).

7. A safety wheel as set forth in claim 1, in which said flat protector (Fp) includes annular reinforcing cords (19) of unstretchable material such as steel wire embedded in the outer peripheral sections of said opposite side wall portions (14, 15) and/or said bridging wall portion (16).

8. A safety wheel as set forth in claim 1, in which said flat protector (Fp) is formed on the outer peripheral surfaces of said opposite side wall portions (14, 15) with straight puncture-sensing regions (8a) which lie within the outer peripheral circle (Cf) of said flat protector and extend in parallel with a tangent thereto.

9. A safety wheel as set forth in claim 8, in which said flat protector (Fp) is formed on the outer periphery thereof with puncture-sensing ridges (8b) at least at those ends of said straight puncture-sensing regions (8a) which precede in the forward direction of rotation of said flat protector (Fp), said puncture-sensing ridges (8b) extending radially outwardly beyond the outer peripheral circle (Cf) of said flat protector (Fp).

10. A safety wheel as set forth in claim 9, in which said flat protector (Fp) is formed on the outer periphery thereof at the opposite ends of each of said straight puncture-sensing regions (8a) with a pair of puncture-sensing ridges (8b) which are formed symmetrical with each other.

11. A safety wheel as set forth in claim 8, in which the outer surface of each of said straight puncture-sensing regions (8a) lies outwardly beyond the bottom surface of said annular recess (17).

12. A safety wheel as set forth in claim 1, in which said split rim (R) is provided on the outboard side thereof with an air supply valve (V) and the rim base portion (9, 11) of said split rim (R) is formed therein with an inlet air passageway (8) connected at one end to said air supply valve (V) and opening at the other end in the outer peripheral surface of the rim base portion (9, 11) of said split rim (R) at a location between said opposite side wall portions (14, 15) of said flat protector (Fp) and said bridging wall portion (16) thereof is formed therein with a vent hole (18) to intercommunicate said inlet air passageway (8) and said annular recess (17) provided around the outer periphery of said bridging wall portion (16).

* * * * *